United States Patent [19]

Jones et al.

[11] Patent Number: 5,657,439
[45] Date of Patent: Aug. 12, 1997

[54] DISTRIBUTED SUBSYSTEM SPARING

[75] Inventors: Michael Reese Jones; Jaishankar Moothedath Menon, both of San Jose, Calif.

[73] Assignee: International Business Machines Corporation, Armonk, N.Y.

[21] Appl. No.: 552,999

[22] Filed: Nov. 3, 1995

Related U.S. Application Data

[63] Continuation of Ser. No. 294,703, Aug. 23, 1994, abandoned.

[51] Int. Cl.⁶ .............................. G06F 11/00; G06F 11/20
[52] U.S. Cl. .................. 395/182.05; 395/182.06; 395/492; 371/10.2; 364/268; 364/269.2; 364/245.3
[58] Field of Search ................. 395/182.02, 182.03, 395/182.04, 182.05, 182.06; 371/10.2, 10.3, 21.1, 40.1; 364/268, 268.5, 269.2, 245.3, 246.3, 245

[56] References Cited

U.S. PATENT DOCUMENTS

| | | | |
|---|---|---|---|
| 4,092,732 | 5/1978 | Ouchi | 364/900 |
| 4,761,785 | 8/1988 | Clark et al. | 371/51 |
| 5,208,813 | 5/1993 | Stallmo | 371/10.1 |
| 5,235,601 | 8/1993 | Sallmo et al. | 371/40.1 |
| 5,258,984 | 11/1993 | Menon et al. | 371/10.1 |
| 5,283,790 | 2/1994 | Kawashita | 371/10.1 |
| 5,301,297 | 4/1994 | Menon et al. | 395/425 |
| 5,390,187 | 2/1995 | Stallmo | 371/10.1 |
| 5,485,571 | 1/1996 | Menon | 395/182.05 |

OTHER PUBLICATIONS

D. A. Patterson et al., "A Case for Redundant Arrays of Inexpensive Disks (RAID)", Report No. UCB/CSD 87/391, Dec. 1987, Computer Science Division (EECS), University of California, Berkeley.

K. Salem et al., "Disk Striping", IEEE 1986 International Conf. on Data Engineering, pp. 336–342.

*Primary Examiner*—Robert W. Beausoliel, Jr.
*Assistant Examiner*—Dieu-Minh Le
*Attorney, Agent, or Firm*—Ingrid M. Foerster; Jenkens & Gilchrist; George E. Clark

[57] ABSTRACT

A method and apparatus for sharing distributed spares of a first array with a second array in a storage subsystem which included a number of storage arrays requires that at least a first array of the subsystem has available distributed spares, and that at least a second array has a same number of "rows" as the first array, for spare sharing. When a device failure occurs on the second array, the data and parity blocks of the failed device are reconstructed and placed in the spares of the first array, and the block addresses are appropriately remapped to the spares. Distributed spare sharing is possible because the first array is configured to include at least one spare region/row, and the second array will never lose a number of blocks greater than the common number of rows in the first array in a single device failure. Distributed spare sharing optimizes a storage subsystem, because all spares within arrays of the subsystem having an equal number of rows must be depleted before device replacement becomes mandatory.

94 Claims, 9 Drawing Sheets

FIG. 3

ARRAY A1

|  | d1 | d2 | d3 | d4 | d5 | d6 |
|---|---|---|---|---|---|---|
| $r_1$ | $a_1$ | $a_2$ | $a_3$ | X | $P_a$ | $(a_4)$ |
| $r_2$ | $b_2$ | $b_3$ | $b_4$ | X | $(P_b)$ | $b_1$ |
| $r_3$ | $c_3$ | $c_4$ | $P_c$ | X | $c_1$ | $c_2$ |
| $r_4$ | $e_4$ | $P_e$ | $(e_1)$ | X | $e_2$ | $e_3$ |
| $r_5$ | $P_f$ | $(f_2)$ | $f_1$ | X | $f_3$ | $f_4$ |
| $r_6$ | $(g_3)$ | $g_1$ | $g_2$ | X | $g_4$ | $P_g$ |

ARRAY A2

|  | d1 | d2 | d3 | d4 |
|---|---|---|---|---|
| $r_1$ | $h_1$ | $h_2$ | $h_3$ | $P_h$ |
| $r_2$ | $j_2$ | $j_3$ | $P_j$ | $j_1$ |
| $r_3$ | $k_3$ | $P_k$ | $k_1$ | $k_2$ |
| $r_4$ | $P_m$ | $m_1$ | $m_2$ | $m_3$ |
| $r_5$ | $n_1$ | $n_2$ | $n_3$ | $P_n$ |
| $r_6$ | $o_2$ | $o_3$ | $P_o$ | $o_1$ |

ARRAY A1

|  | d1 | d2 | d3 | d4 | d5 | d6 |
|---|---|---|---|---|---|---|
| $r_1$ | $a_1$ | $a_2$ | $a_3$ | $a_4$ | $P_a$ | $h_2$ |
| $r_2$ | $b_2$ | $b_3$ | $b_4$ | $P_b$ | $j_3$ | $b_1$ |
| $r_3$ | $c_3$ | $c_4$ | $P_c$ | $P_k$ | $c_1$ | $c_2$ |
| $r_4$ | $e_4$ | $P_e$ | $m_1$ | $e_1$ | $e_2$ | $e_3$ |
| $r_5$ | $P_f$ | $n_2$ | $f_1$ | $f_2$ | $f_3$ | $f_4$ |
| $r_6$ | $o_3$ | $g_1$ | $g_2$ | $g_3$ | $g_4$ | $P_g$ |

ARRAY A2

|  | d1 | d2 | d3 | d4 |
|---|---|---|---|---|
| $r_1$ | $h_1$ | x | $h_3$ | $P_h$ |
| $r_2$ | $j_2$ | x | $P_j$ | $i_1$ |
| $r_3$ | $k_3$ | x | $k_1$ | $k_2$ |
| $r_4$ | $P_m$ | x | $m_2$ | $m_3$ |
| $r_5$ | $n_1$ | x | $n_3$ | $P_n$ |
| $r_6$ | $o_2$ | x | $P_o$ | $o_1$ |

FIG. 9

ARRAY A1

| | d1 | d2 | d3 | d4 | d5 | d6 |
|---|---|---|---|---|---|---|
| $r_1$ | X | $a_2$ | $a_3$ | X | $P_a$ | ⓐ$_4$ |
| $r_2$ | X | $b_3$ | $b_4$ | X | Ⓟ$_b$ | $b_1$ |
| $r_3$ | X | $c_4$ | $P_c$ | X | $c_1$ | $c_2$ |
| $r_4$ | X | $P_e$ | ⓔ$_1$ | X | $e_2$ | $e_3$ |
| $r_5$ | X | Ⓕ$_2$ | $f_1$ | X | $f_3$ | $f_4$ |
| $r_6$ | X | $g_1$ | $g_2$ | X | $g_4$ | $P_g$ |

ARRAY A2

| | d1 | d2 | d3 | d4 | d5 |
|---|---|---|---|---|---|
| $r_1$ | $h_1$ | $h_2$ | $h_3$ | $P_h$ | ⓐ$_1$ |
| $r_2$ | $j_2$ | $j_3$ | $P_j$ | ⓑ$_2$ | $j_1$ |
| $r_3$ | $k_3$ | $P_k$ | ⓒ$_3$ | $k_1$ | $k_2$ |
| $r_4$ | $P_m$ | ⓔ$_4$ | $m_1$ | $m_2$ | $m_3$ |
| $r_5$ | Ⓟ$_4$ | $n_1$ | $n_2$ | $n_3$ | $P_n$ |
| $r_6$ | $o_1$ | $o_2$ | $o_3$ | $P_o$ | ⓖ$_3$ |

DISTRIBUTED SUBSYSTEM SPARING

This application is a continuation of application No. 08/294,703, filed on Aug. 23, 1924, which was abandoned upon the filing hereof.

FIELD OF THE INVENTION

The present invention relates generally to RAID systems and in particular to a method for sharing spares across two or more arrays in a multiple array system.

BACKGROUND OF THE INVENTION

A data processing system typically comprises a central processing unit (CPU) and a storage subsystem linked through an appropriate interface and control system. The subsystem includes a plurality of storage units such as high capacity direct access storage devices (DASDs). An economical alternative to high-end DASD is a subsystem comprising redundant arrays of inexpensive disks (RAID). A number of RAID architectures are described in a foundational article entitled "A Case for Redundant Arrays of Inexpensive Disks (RAID)", by D. A. Patterson et al., Report No. UCB/CSD 87/391, December 1987, incorporated herein by reference.

A number of early storage subsystems provided redundant secondary devices for duplicating data as a back up to primary devices in the event of drive failure. Such redundancy improves system reliability, but substantially decreases the data capacity of the subsystem because substantial space is required for duplicated data.

In a more efficient redundancy method, data is "striped" or distributed across the plural devices of a storage array rather than being written to a single storage device. For example, a storage system may include N+P devices. Each device further includes a plurality of predefined data regions that may be the size of a disk block, multiple disk blocks, a track, a cylinder, etc. An incoming data stream comprises N logically consecutive data blocks which are distributed to corresponding addresses of N array devices. The blocks are the same size as the predefined data regions and are distributed such that no two blocks of data from the same transfer unit reside on the same device. Parity information is generated for the N blocks and is stored on a separate device P. A group of data blocks and corresponding parity are called a parity group and are represented as (N+P). The size of the parity group is determined by the number of devices, N+P, in the subsystem.

In the event of a single device failure, no more than one data block of each parity group will be lost, due to the manner in which stored data and parity are distributed. The lost data can be reconstructed from the remaining data and parity blocks residing on other devices. The combination of striping and parity thus assures that a single device failure will not result in unrecoverable data loss. Data distribution over a plurality of failure independent DASDs is disclosed in commonly assigned U.S. Pat. No. 4,092,732 to Ouchi. Benefits of data striping are discussed further in a paper entitled "Disk Striping" by K. Salem and H. Garcia-Molina published in the IEEE 1986 Int'l. Conf. on Data Engineering, pp. 336–342.

Data Distribution in RAID Subsystems

Data striping and parity are features of RAID levels two, three, four and five. In RAID levels two and three, a subsystem includes N synchronized data devices and at least one dedicated parity device. Data must be transferred synchronously to the N+P devices in fixed "data transfer units" having exactly N data blocks. A data block is the size of a predefined data region in the storage devices. In contrast, the devices in RAID four and five subsystems are asynchronous, allowing data to be transferred in units of less than N blocks. Level four has a dedicated parity device. In RAID five, parity is distributed across the N+P failure independent drives.

Device arrays representative of RAID three, four and five are shown below. Data regions are assumed to be 512 bytes for illustration purposes only.

RAID 3 Array (N = 4)

| Address | d1 d2 d3 d4 ck1 | Data transfer units D0–D3: |
|---|---|---|
| 0–511 | a0 a1 a2 a3 Pa | D0 = a0 + a1 + a2 + a3 |
| 512–1023 | b0 b1 b2 b3 Pb | D1 = b0 + b1 + b2 + b3 |
| 1024–1535 | c0 c1 c2 c3 Pc | D2 = c0 + c1 + c2 + c3 |
| 1536–2047 | d0 d1 d2 d3 Pd | D3 = d0 + d1 + d2 + d3 |

RAID 4 Array

| Address | d1 | d2 | d3 | d4 | ck | Data units: D0–D15 |
|---|---|---|---|---|---|---|
| 0–511 | D0 | D1 | D2 | D3 | P0 | |
| 512–1023 | D3 | D4 | D5 | D6 | P1 | |
| 1024–1535 | D8 | D9 | D10 | D11 | P2 | |
| 1536–2047 | D12 | D13 | D14 | D15 | P3 | |

RAID 5 Array (Distributed parity)

| Address | d1 | d2 | d3 | d4 | d5 | Data units: D0–D19 |
|---|---|---|---|---|---|---|
| 0–511 | D0 | D1 | D2 | D3 | P0 | |
| 512–1023 | D5 | D6 | D7 | P1 | D4 | |
| 1024–1535 | D10 | D11 | P2 | D8 | D9 | |
| 1536–2047 | D15 | P3 | D12 | D13 | D14 | |
| 2048–2559 | P4 | D16 | D17 | D18 | D19 | |

The RAID three array comprises N=4 data devices, d1–d4, and a single dedicated parity device, ck1. Each data transfer unit consists of N*512 bytes, which are synchronously distributed across the N=4 data devices. For example, four data blocks, a0–a3, form data transfer unit D0. These blocks are distributed to corresponding address locations on the N data devices, as shown. Parity block P0, also 512 bytes, is simultaneously written to device ck1. Blocks a0–a3 and P0 form a first parity group in the first row of the array (addresses 0–511 of each device). Each subsequent row similarly holds a parity group. Note that no two blocks from the same parity group reside on the same device.

The RAID four array comprises N=4 data devices and one dedicated parity device. Data blocks D0–D15 are distributed asynchronously to the subsystem array. Parity information is generated for each row of data and is stored on drive ck. Each row forms a parity group. For example, a first parity group includes data blocks D0–D3 and parity block P0.

The RAID five array consists of five devices. Data blocks D0–D19 are distributed asynchronously across all five devices. There is no dedicated check device, since parity is distributed across all of the devices of the array, as shown. Again, each row forms a parity group. E.g., data blocks D0–D3 and parity block P0 form the first parity group. An example of a subsystem with distributed data and distributed parity is disclosed in commonly assigned U.S. Pat. No. 4,761,785 to Clark et al.

Data striping is desirable in storage subsystems for large data transfers because it provides faster transfer rates by accessing multiple disks at the same time, rather than writing large amounts of data to a single devices. Parity schemes provide the additional benefit of improved system reliability.

Array Nomenclature

For convenience, a device array is treated as a matrix of columns and rows. The "columns" comprise the array devices, N+P, which are further subdivided into M predefined data regions. Each region of a device is identified by a unique range of physical addresses. For example, in the RAID 5 system shown above, addresses 0–511 delimit the first region of each device, addresses 512–1023 delimit the second region, and so forth. Corresponding regions of the array comprise "rows". This nomenclature permits one to define a subsystem array as an M X (N+P) array. A sample M X (N+P) RAID 4 array having three columns (N+P, N=2, P=1) and M=3 "rows" is shown in Example 1.

EXAMPLE 1

|   | d1 | d2 | ck1 | Data units: D0–D5 |
|---|---|---|---|---|
| A = r1 ( | D0 | D1 | P0 ) | |
| r2 ( | D2 | D3 | P1 ) | |
| r3 ( | D4 | D5 | P2 ) | |

Data blocks D0–D5 are distributed across the array and corresponding parity blocks P0–P2 reside on the dedicated device, ck1. The array holds M parity groups, one per row. Each parity group has N+1 blocks, and no two blocks of the same parity group reside on the same device.

Dedicated Sparing

In a distributed data subsystem with parity, a single device failure results in the loss of a maximum of M blocks of information. A DATA block is restored from the remaining data and parity blocks of its parity group. For example, if device d1 of Example 1 were to fail, blocks D0, D2 and D4 would be lost. Block D0 is reconstructed by reading blocks D1 and P0 on failure independent devices d2 and d3, and recreating the lost block according to known recovery procedures. Lost PARITY blocks are restored by generating new parity information from the remaining data blocks of the parity group. For example, if device ck1 of Example 1 fails, parity block P0 is regenerated from data blocks D0 and D1 on intact devices d1 and d2.

Data restoration requires sufficient available (i.e. spare) regions within the array to hold newly restored blocks of information. One method for assuring that sufficient space is available is to provide a "dedicated spare", i.e. an additional device within the array dedicated to data restoration. A dedicated spare must include at least M spare regions for holding the maximum of M blocks of reconstructed data that are lost in a device failure. A RAID 5 array including M=3 parity groups and a spare device is shown in Example 2, below. The array is referred to as an (N+P+S) configuration.

EXAMPLE 2

|   | d1 | d2 | d3 | s1 |
|---|---|---|---|---|
| A = r1 ( | D0 | D1 | P0 | S ) |
| r2 ( | D2 | P1 | D3 | S ) |
| r3 ( | P2 | D4 | D5 | S ) |

In the event of a device failure, lost blocks are reconstructed in the spare device, s1. For example, if device d1 fails, three blocks of information are lost (i.e. D0, D2 and P2). The blocks are reconstructed within the spare device as shown in Example 3. Lost blocks are indicated by an "XX".

EXAMPLE 3

|   | d1 | d2 | d3 | s1 |
|---|---|---|---|---|
| A = r1 ( | XX | D1 | P0 | D0 ) |
| r2 ( | XX | P1 | D3 | D2 ) |
| r3 ( | XX | D4 | D5 | P2 ) |

A single device failure and recovery has depleted the array in Example 3 of spare space. If the subsystem includes multiple arrays of devices, dedicated spares may be shared among the arrays. Thus if a second device failure now occurs in the array of Example 3, lost data may be rebuilt in the dedicated spare of another array. When all spare space has been depleted in the subsystem, manual drive replacement becomes necessary.

If the array of Example 3 were a single-array subsystem, a second device failure would require immediate drive replacement. Reliability can be enhanced by providing a second dedicated spare, thereby doubling the amount of spare space. The resulting system may be represented as A=(N+P+S, S=2) and is capable of recovering from two nonconcurrent device failures before depleting its available spare space. (The failure of a second device which is concurrent with the data recovery process from a first device failure will result in the permanent loss of some data). A RAID 5 (N+P+S, S=2) dedicated sparing array is shown in Example 4.

EXAMPLE 4

|   | d1 | d2 | d3 | s1 | s2 |
|---|---|---|---|---|---|
| A = r1 ( | D0 | D1 | P0 | S1 | S2 ) |
| r2 ( | D2 | P1 | D3 | S1 | S2 ) |
| r3 ( | P2 | D4 | D5 | S1 | S2 ) |

Distributed Sparing

An alternative to the dedicated sparing approach is a "distributed sparing" scheme, wherein spare regions are distributed across multiple devices. Distributed sparing improves performance in arrays having asynchronously accessible devices, since data can be reconstructed on several devices at the same time. Commonly assigned U.S. Pat. No. 5,258,984 describes a distributed sparing method in which at least one spare region is provided for each parity group of an array. An example of a RAID 5 (N+P+S, S=1) array with distributed sparing is shown in Example 5, below.

EXAMPLE 5

|   | d1 | d2 | d3 | d4 |
|---|---|---|---|---|
| A = r1 ( | D0 | D1 | P0 | S ) |
| r2 ( | D3 | P1 | S | D2 ) |
| r3 ( | P2 | S | D4 | D5 ) |
| r4 ( | S | D6 | D7 | P3 ) |

As in dedicated sparing schemes, system reliability may be improved by doubling the number of distributed spares provided per row. An example of an (N+P+S, S=2) distributed sparing array is shown in Example 6, below.

EXAMPLE 6

```
        d1  d2  d3  d4  d5
A = r1 (D0  D1  P0  S1  S2)
    r2 (D3  P1  S1  S2  D2)
    r3 (P2  S1  S2  D4  D5)
    r4 (S1  S2  D6  D7  P3)
    r5 (S2  D8  D9  P4  S1)
```

Such (N+P+S, S=2) configurations are able to tolerate two nonconcurrent device failures before the spare space is depleted and manual drive replacement becomes necessary. Thus it would seem desirable to provide a large number of distributed spares per parity group to enhance system fault tolerance. However, increasing spares causes a corresponding reduction in data capacity, since the spare space is unavailable for data storage. It is therefore necessary to find an acceptable balance between fault tolerance and data capacity.

Distributed sparing offers a number of advantages over a dedicated sparing approach. One advantage is that all devices within the array are in use, improving overall system performance. For example, four devices are in use in the distributed sparing array of Example 5, whereas only three devices are operating in the dedicated sparing array of Example 2. Moreover, since dedicated spare devices are inoperative until data restoration is required, there is no assurance that spare devices will function properly when needed. By having all devices in use, the risk of latent drive malfunctions is avoided. Another advantage, as previously mentioned, is improved system performance due to parallel data reconstruction.

A problem with distributed sparing arrays is that of sharing spares between multiple subsystem arrays. This problem is discussed in greater detail below.

Method for Sharing Distributed Spares

It is desirable for all arrays of a subsystem to share available spare space, thereby delaying the need for manual drive replacement as long as possible and improving overall system fault tolerance.

To illustrate, a subsystem might include the following RAID 5 arrays: $A_1=(N_1+P)$, $A_2=(N_2+P+S_2, S_2=1)$ and $A_3=(N_3+P+S_3, S_3=2)$. Without the ability to share spares between these arrays, spare space within the subsystem is not used efficiently. For example, the $A_2$ array would require drive replacement after two device failures even if spare space is still available in array $A_3$. Furthermore, $A_1$ could not recover from a device failure because it lacks spares altogether. As such, the subsystem described does not use spare space efficiently.

Distributed spare sharing is not as straightforward as sharing dedicated spare space. One problem is that of dealing with differences in array dimensions. To illustrate, consider the RAID 5 shown below.

```
           d1  d2  d3
A₁ = r1 (D0  D1  P0)
     r2 (D3  P1  D2)
     r3 (P2  D4  D5), d1  d2  d3  d4
A₂ = r1 (D0  D1  P0  S)
     r2 (D3  P1  S   D2)
     r3 (P2  S   D4  D5), and
```

```
           d1  d2  d3  d4  d5  d6
A₃ = r1 (D0  D1  D2  P0  S1  S2)
     r2 (D4  D5  P1  S1  S2  D3)
     r3 (D8  P2  S1  S2  D6  D7)
     r4 (P3  S1  S2  D9  D10 D11)
     r5 (S1  S2  D12 D13 D14 P4).
```

If a failure occurs in device d1 of array $A_1$, three blocks of information must be reconstructed (i.e., D0, D3 and P2). Array $A_1$ does not have any spare regions, but because at least three spares are available on both $A_2$ or $A_3$, the data lost in $A_1$ may be reconstructed in either array. A problem arises, however, if a device failure results in the loss of more data blocks than available spare space. To illustrate, it will be assumed that two device failures have occurred on array $A_3$, as shown below, depleting the spares within that array. Failed devices are indicated by a column of X's and reconstructed data is designated in boldface.

$A_3$ after a device failure in d6,

```
           d1  d2  d3  d4  d5  d6
A₃ = r1 (D0  D1  D2  P0  S1  XX)
     r2 (D4  D5  P1  D3  S1  XX)
     r3 (D8  P2  D7  S1  D6  XX)
     r4 (P3  D11 S1  D9  D10 XX)
     r5 (P4  S1  D12 D13 D14 XX); and
```

$A_3$ after a device failure in d5,

```
           d1  d2  d3  d4  d5  d6
A₃ = r1 (D0  D1  D2  P0  XX  XX)
     r2 (D4  D5  P1  D3  XX  XX)
     r3 (D8  P2  D7  D6  XX  XX)
     r4 (P3  D11 D10 D9  XX  XX)
     r5 (P4  D14 D12 D13 XX  XX).
```

Upon a third device failure it would be desirable to reconstruct the lost data within the spare space of another subsystem array. For example, if device d1 of array $A_3$ fails, five blocks of information are lost (i.e., D0, D4, D8, P3 and P4). Thus five spare regions are needed for data reconstruction. But there are only three spares are available in the subsystem, i.e. on array $A_2$. Since three spares are insufficient for reconstruction of five blocks, the option of spare sharing between $A_3$ and $A_2$ is eliminated in this situation.

In short, distributed sparing schemes do not allow efficient use of subsystem spare space unless spares can be shared between arrays. However, arrays with distributed spares often vary from one another in dimensions. Consequently, the number of spares available in each array having distributed spares will also vary. Ultimately, there is no assurance that sufficient spares will exist on one array to accommodate the loss of information on another array, i.e. arrays must be compatible in order for spare sharing to work.

What is needed is a method for configuring a storage subsystem comprising a plurality of arrays to assure compatibility of arrays for sharing distributed spare space across array boundaries. Spare sharing uses the spare space within a subsystem more efficiently.

Another consideration related to distributed spare sharing is that of remapping the logical to physical address of the reconstructed data from its original location within a first array to its new location within the spare space of a second array. Remapping involves updating a table in subsystem memory to reflect the new array, device, cylinder and head address of each block of restored data or parity. Such remapping is easily implemented according to methods known by those having ordinary skill in storage management.

SUMMARY OF THE INVENTION

It is therefore a principal object of the present invention in a storage subsystem comprising at least a first and a second array of storage devices, wherein a first array includes distributed spares, wherein a second array has experienced a device failure and has no spare space available for data reconstruction, to provide a subsystem configured to assure compatibility between the two arrays so that distributed spare sharing may take place.

It is a further object of the invention to improve overall subsystem fault tolerance by using spare all space within a distributed sparing subsystem more efficiently than similar, presently known subsystems.

Another object of the present invention is to provide a method for sharing of distributed spares between two or more subsystem arrays, each having a different number of devices.

A further object of the present invention is to increase the reliability of a subsystem comprising a plurality of arrays without causing a corresponding decrease in data capacity.

Accordingly, the present invention is a method for configuring a storage subsystem comprising at least two device arrays to enable sharing of distributed spare space across array boundaries.

At least a first array, $A_1$, is configured as an $(N_1+P_1+S_1)$ group. That is, $N_1+P_1+S_1$ devices or "columns" are provided, and each column is further subdivided into M regions for holding blocks of information. The array accommodates M $(N_1+P_1)$ parity groups distributed across the M "rows" or stripes of the array, preferably such that no two blocks of a parity group reside on the same device. Each row further includes $S_1$ blocks of reserved spare space such that at least $S_1*M$ spares are reserved in the first array. The spares are distributed across the $N_1+P_2+S_1$ devices rather than being reserved on a single device. The number of spares provided per row, $S_1$, is greater than zero.

At least a second array, $A_2$, includes $N_2+P_2+S_2$ devices which are similarly subdivided into M regions. A maximum of M $(N_2+P_2)$ parity groups are distributed across the second array, one per "row", preferably such that no two blocks from the same group reside on the same storage device. Array $A_2$ includes $S_2*M$ distributed spares, where the value of $S_2$ may be zero or greater.

In the event of a device failure in $A_2$, a maximum of M blocks of data and/or parity will be lost and will require reconstruction. Reconstruction is performed according to presently known methods, depending on the particular redundancy scheme of the subsystem. For example, according to one commonly used method, parity is generated by exclusive OR-ing the data blocks of a parity group. A data block may be restored by retrieving the remaining blocks of its parity group, including parity, and logically XOR-ing them to create a new data block. A parity block is reconstructed by retrieving the intact data blocks of the same group and XOR-ing them to create a new parity block.

A maximum of M spare regions are needed to hold the newly constructed blocks. According to the present invention, the first and second arrays, $A_1$ and $A_2$, have specifically been configured to have a same number of rows, assuring that at least M spare regions, each large enough to hold a data block, will be available on the first array to accommodate the reconstructed information (provided that all spare space within the first array has not been depleted first by device failures on that array). The reconstructed blocks of $A_2$ are stored in M distributed spares of $A_1$, and the mapping tables associated with each array are updated to reflect the new physical block addresses.

Storage subsystems may comprise a plurality of arrays. The present invention is directed to permitting sharing of distributed spares between at least two arrays of a multiple-array subsystem. In the ideal subsystem, however, each array is configured to have M rows or stripes, regardless of array type, so that distributed spares available in any array can be shared with any other array of the subsystem.

BRIEF DESCRIPTION OF THE DRAWING

The foregoing and other objects, features and advantages of the present invention will be apparent from the following detailed description of the preferred embodiments of the invention, and from the accompanying figures of the drawing:

FIG. 3 is shows the states of the arrays of FIG. 2 after data restoration according to a presently known method;

FIG. 4 represents the states of two device arrays in a storage subsystem with a device failure on Array A2;

FIG. 6 shows the state of the arrays of FIG. 4 after data restoration according to the present invention;

FIG. 9 shows the state of the arrays of FIG. 8 after data recovery from the second device failure according to the present invention.

DESCRIPTION OF THE PREFERRED EMBODIMENT

Subsystem Architecture

Figure 1A:
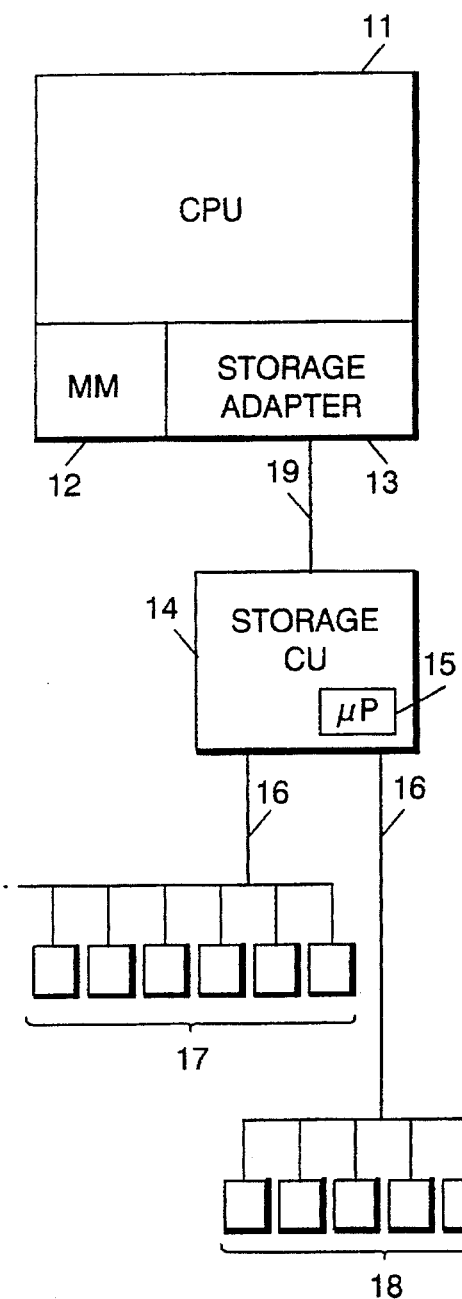
FIGS. 1(a)–(b) are two examples of storage subsystems connected to a CPU through an appropriate interface.

The distributed spare sharing method of the present invention will now be described with initial reference to FIGS. 1(a) and 1(b), which show two alternative architectures for linking a host computer central processing unit (CPU) 11 to an array subsystem. In FIG. 1(a), a host CPU 11 includes main memory 12 and a storage adapter 13 through which it communicates with the subsystem. The subsystem comprises a storage control unit 14, including a microprocessor 15, and two or more storage device arrays 17,18. The system shown may, for example, be an IBM AS/400 mid-range computer linked to an IBM 9337 subsystem through a SCSI interface. The IBM 9337 supports both standard and RAID 5 array architectures. The device arrays 17, 18 may be a plurality of 3½ inch magnetic disk drives linked to the storage control unit 14 through a SCSI interface.

Figure 1B:
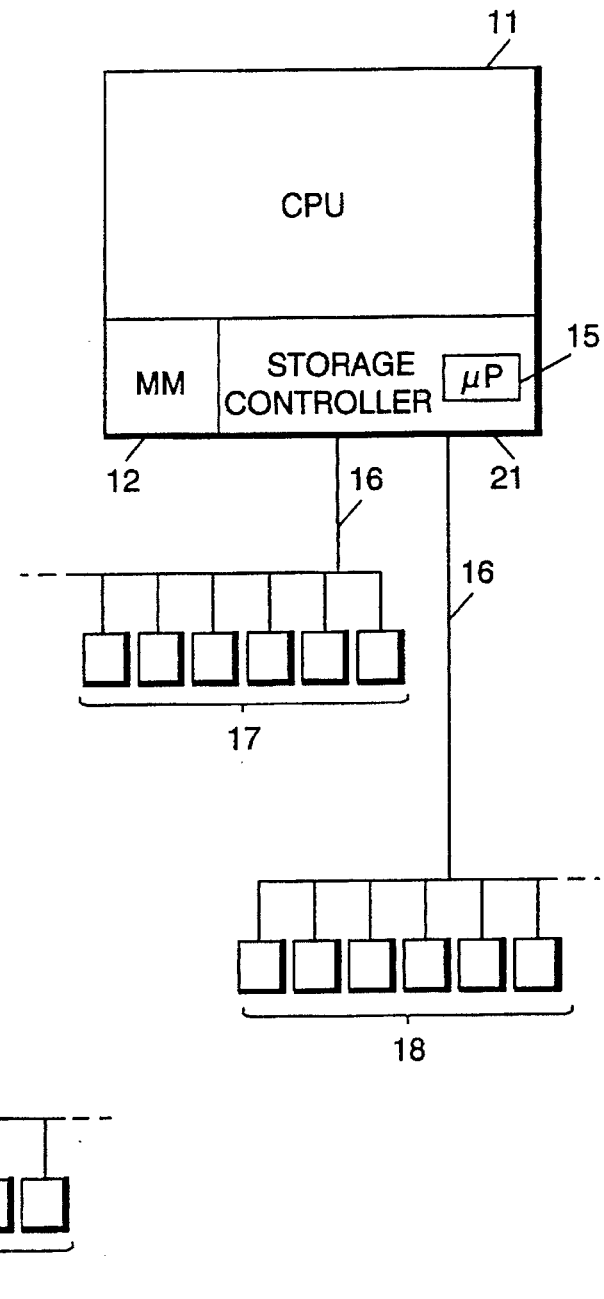

Alternatively, the host computer may link directly to an array subsystem without a separate storage control unit 14, as shown in FIG. 1(b). In this configuration, the CPU includes main memory 12, and a storage adapter 15 with a microprocessor 15 for controlling direct communication with the device arrays 17,18. The adapter may, for example, be a Mylex DAC960P RAID adapter connected to a plurality of 3½ inch device arrays through multiple channel SCSI interfaces 16. RAID may also be implemented in the configuration of FIG. 1(b) through software, e.g. Oasis for OS/2.

Figure 2:
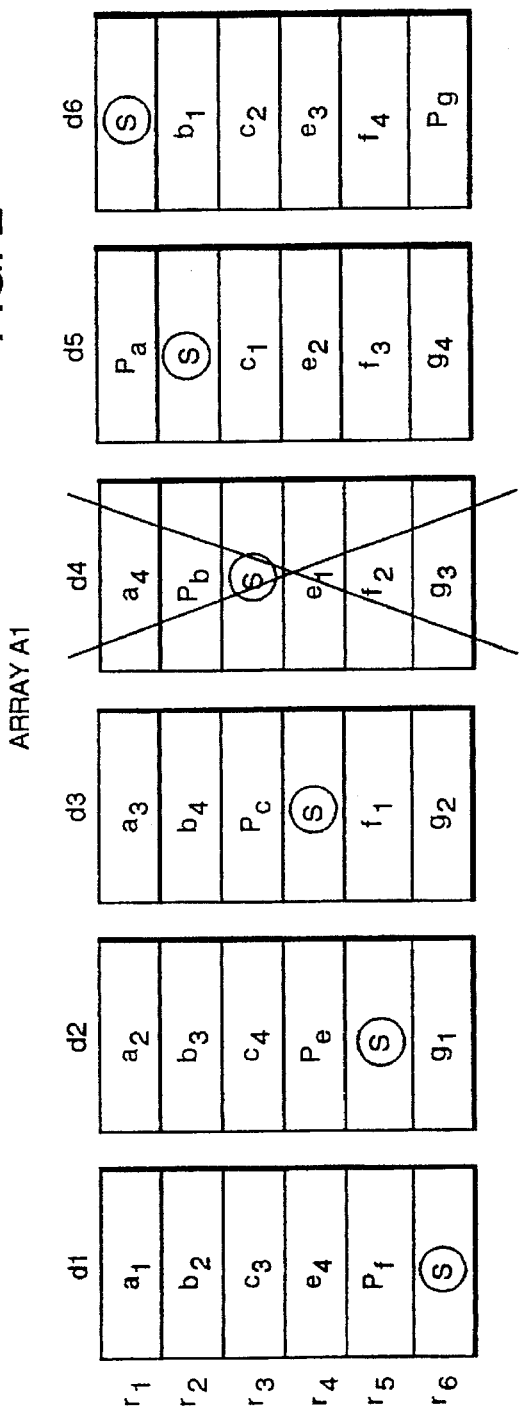
FIG. 2 represents the states of two device arrays in a storage subsystem with a device failure on Array A1.
Figure 2:
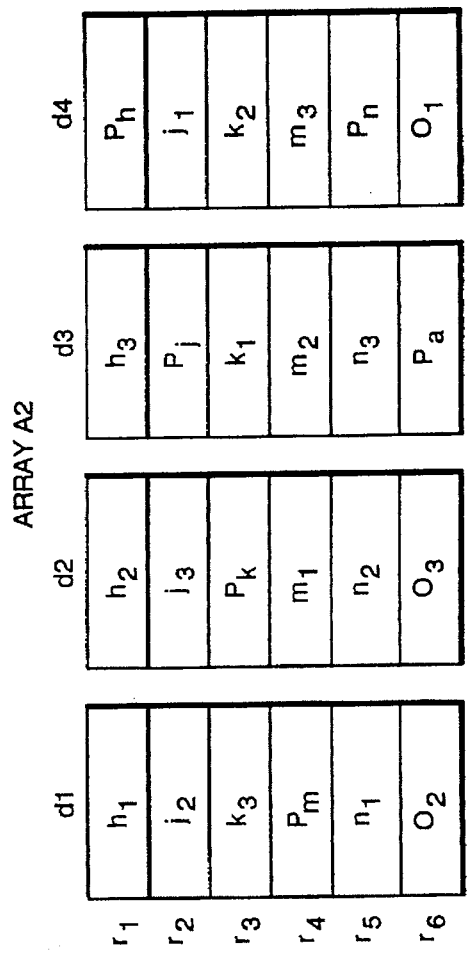

FIG. 2 represents a pair of arrays in a storage subsystem according. A first array, A1, is an ($N_1+P_1+S_1$, $N_1=4$, $P_1=1$, $S_1=1$) array comprising six storage devices or "columns", d1–d6. Each device is subdivided into M=6 regions for storing blocks of information. Six regions are selected for illustration purposes only, as the devices may be partitioned into any predetermined number of regions, depending on region size and device storage capacity. The corresponding regions in the six devices form rows r1–r6.

A second array, A2, is an ($N_2+P_2$, $N_2=3$, $P_1=1$) array and includes four devices, d1–d4. These device columns are similarly subdivided into regions to form six rows, r1–r6, across the devices. (According to the array nomenclature described above, the second array may also be referred to as an ($N_1+P_2+S_2$) array, wherein $S_2=0$). Note that the number of rows in arrays A1 and A2 is the same. This consistency is a key requirement of the present invention, as will be seen shortly, since it permits subsystem arrays of different sizes to share distributed spare space.

In the preferred embodiment of the present invention, each row of arrays A1 and A2 holds a distributed parity group, and no two blocks of a parity group reside on the same device. Such distribution facilitates data restoration in the event of a device failure, as already discussed. For example, row r1 of array A1 holds an ($N_1+P_1$) parity group comprising four data blocks, a1–a4, and a parity block, Pa. A corresponding spare region, S, has been reserved in device d6 of the same row. Parity groups, a–g, are preferably distributed in offset fashion across the array to effect distribution of parity blocks Pa–Pg, as shown. The "distributed parity" arrangement permits faster parallel data reconstruction in the event of a device failure. However, it should be understood that the present invention applies to subsystem arrays with distributed parity (e.g. RAID 5), arrays with dedicated parity devices (e.g. Raid levels 1–4), non-RAID arrays with redundancy, or any combination of the above. The only requirements imposed by the present invention are that at least one array includes distributed spares and that at least two arrays have a same number of rows to allow spare sharing.

Array A1 is configured to have one spare region available per row. According to the present invention, the spares are distributed across the array rather than residing in a single, dedicated device. Array A2 has no spares.

An "X" shown over device d1 of array A1 represents a failure in that device just prior to data restoration procedures. The failure causes the loss of blocks a4, Pb, e1, f2 and g3, which are reconstructed according to presently known restoration methods. The reconstructed blocks are relocated to the spare regions of array A1, as shown in FIG. 3. For example, data block a1 is preferably reconstructed by retrieving blocks a1–a3 from the intact devices and logically XOR-ing them to obtain a new a4 data block. The newly constructed block is then placed the spare region of row r1 as shown. Parity block Pb is similarly reconstructed by retrieving data blocks b1–b4 into memory and logically XOR-ing them to obtain a new parity block, Pb. The restored block Pb is then placed in the spare region of row r2, as shown. Note that neither the device failure nor the data reconstruction has affected array A2. But the spare regions of array A1 are now depleted.

Figure 4:
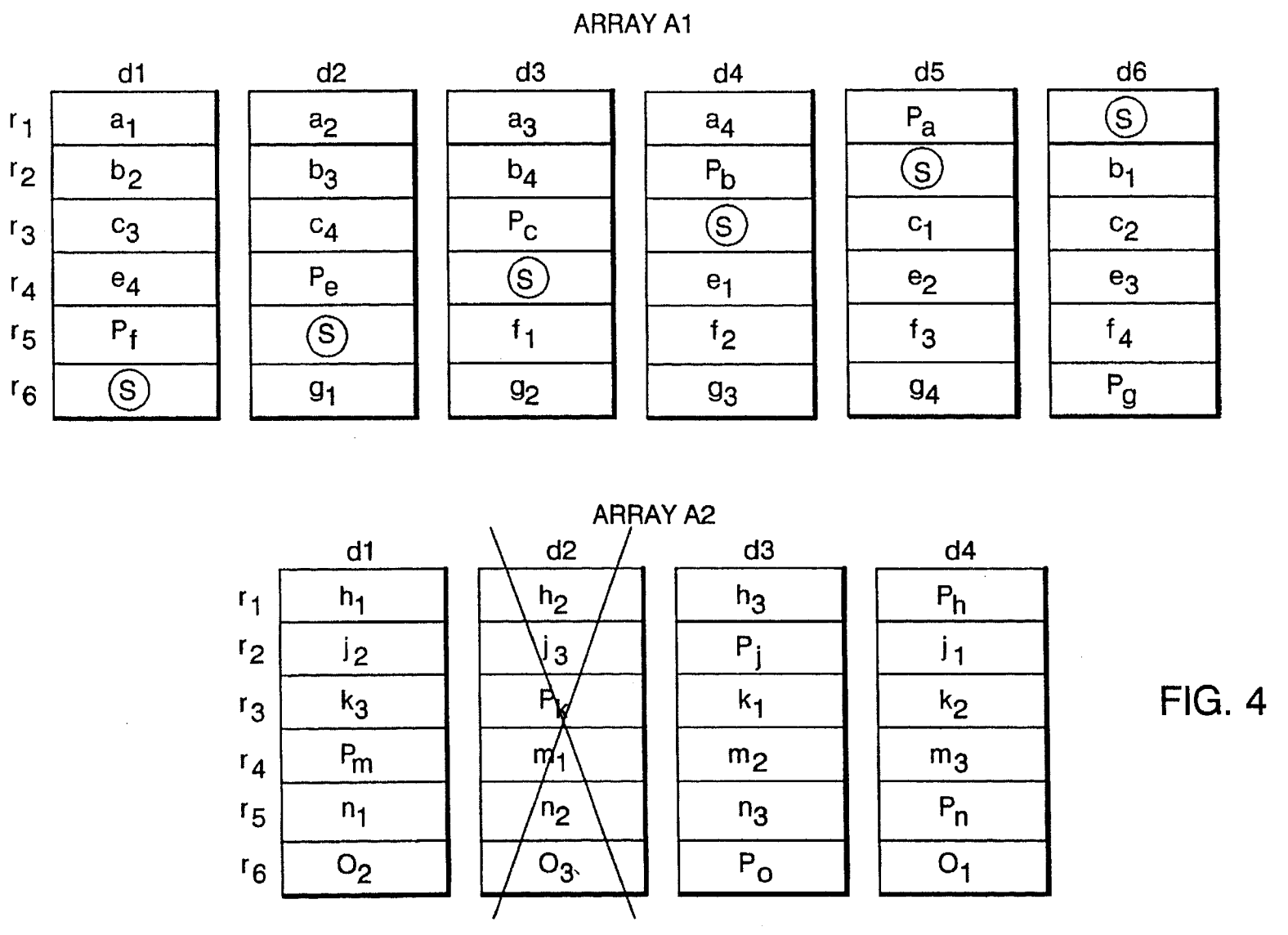

It will now be assumed that no device failure has occurred on array A1, and that a first failure has occurred in device d2 of array A2, as shown in FIG. 4. A failure in d2 results in the loss of data blocks h2, j3, m1, n2 and o3, and of parity block Pk. However, since array A2 has no distributed spares, these blocks can not be restored by presently known methods unless a dedicated spare device is available in the array to hold the newly constructed blocks. Assuming that no spare drives are available, array A2 would require manual drive replacement of d2. The present spare sharing method provides an alternative to drive replacement under these and similar circumstances.

Figure 5:
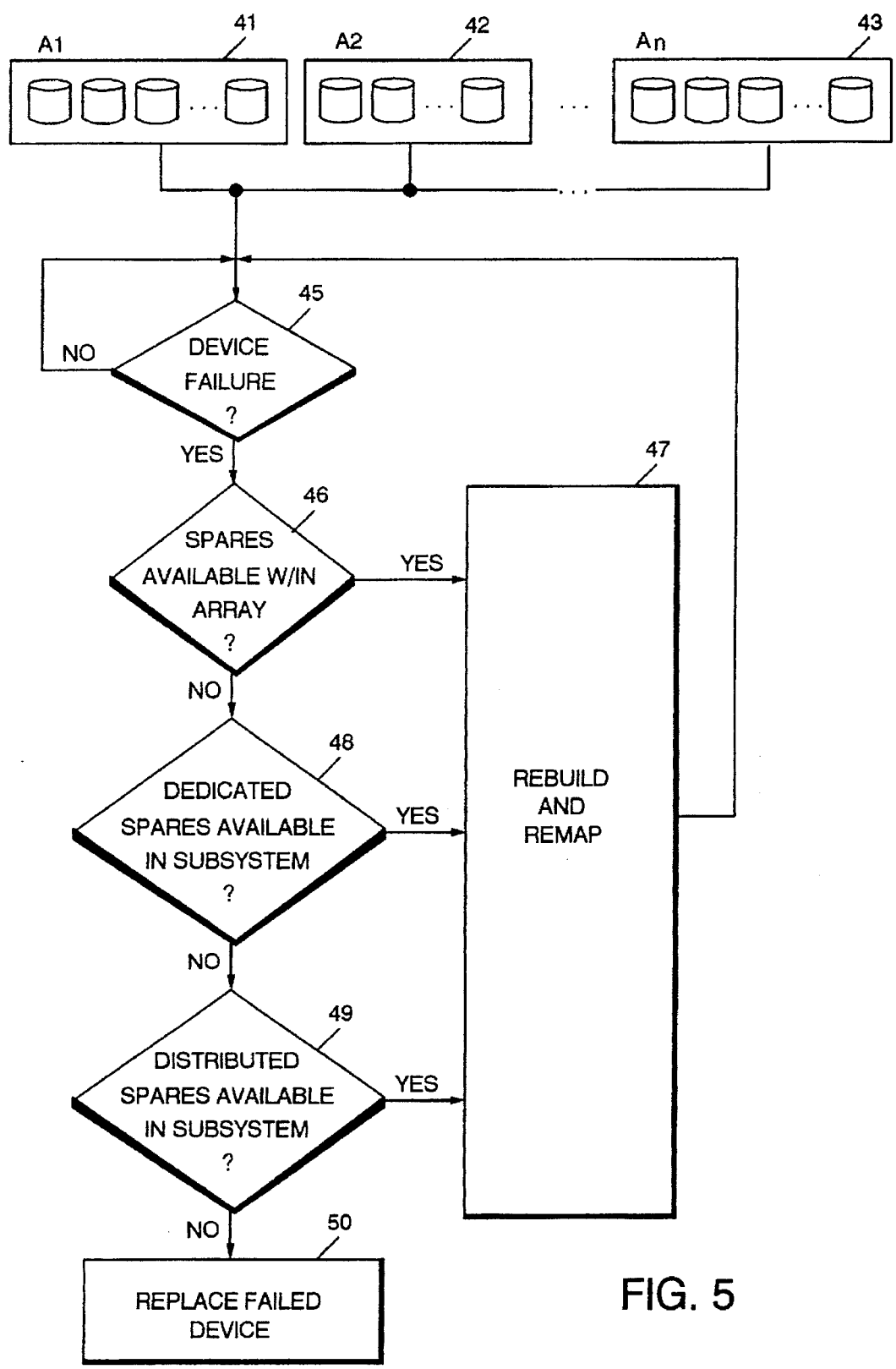
FIG. 5 is a flow diagram illustrating the distributed spare sharing method of the present invention.

FIG. 5 is a flow diagram illustrating the preferred method of the present invention for a subsystem comprising at least two arrays of storage devices, each array having a same number of rows. Each array, 41–43, is monitored for device failures as represented by decision block 45. Upon the detection of a failed device, the array experiencing the failure is assessed to determine if it has spares available 46. If spares are available, the conventional restoration process 47 takes place. That is, lost data and parity blocks are reconstructed according to presently known methods, placed in the spare regions of the array itself, and the address of each restored block is remapped to reflect a change in drive location within the array. If there are no spares available within the array, the subsystem is checked 48 for available space on a dedicated spare device. If spare space is found, the lost blocks are restored, placed in the spares of the dedicated device, and block addresses are remapped 47 to reflect a change in drive location. If no dedicated spares are available, the remaining arrays of the subsystem are checked 49 for available distributed spares. If spare space is found in another array, the data is reconstructed and placed within those distributed spares, and the block addresses are remapped 47 to reflect the change in array and drive location. Only when all spares of the subsystem are depleted will manual device replacement 50 become mandatory. It will be readily apparent that the sequence of FIG. 5 may be implemented in either hardware or software, e.g. by modifying the error recovery software of an existing subsystem. Additionally, the order of decision blocks 46, 48 and 49 may be interchanged without substantially impacting the efficient use of spare space within the subsystem.

Applying the method of FIG. 5 to the subsystem of FIG. 4, it is apparent that no distributed spares are available in array A2 42, and it will be assumed that no dedicated spares are available in the array 46. A scan 49 of the subsystem arrays indicates that unused distributed spares are available in array A1 42. Thus the blocks originally residing on failed device d2 of array A2 are reconstructed according to presently known methods and are relocated 47 to the spare space of array A1, as shown in FIG. 6. For example, reconstructed data block h2 is placed in row r1, device d1 of array A1. Similarly, block j3 is placed in row r2, device d5 of A1, and so on. Relocation of blocks lost in array A2 to corresponding rows of array A1 is convenient, but is not a requirement of the present invention. For example, data block h2 could have been placed in the spare space of row r6, rather than the spare space of row r1, and its new location mapped accordingly. Use of the spare regions in array A1 to restore data/parity from a failed drive of array A2 is possible because both arrays have the same number of rows and array A1 is configured to include one spare region per row. If array A1 were alternatively configured as an ($N_1+P_1+S_1$, $S_1=2$) array, the subsystem could tolerate a second drive failure in A1 or A2 before drive replacement would be required.

Figure 7:
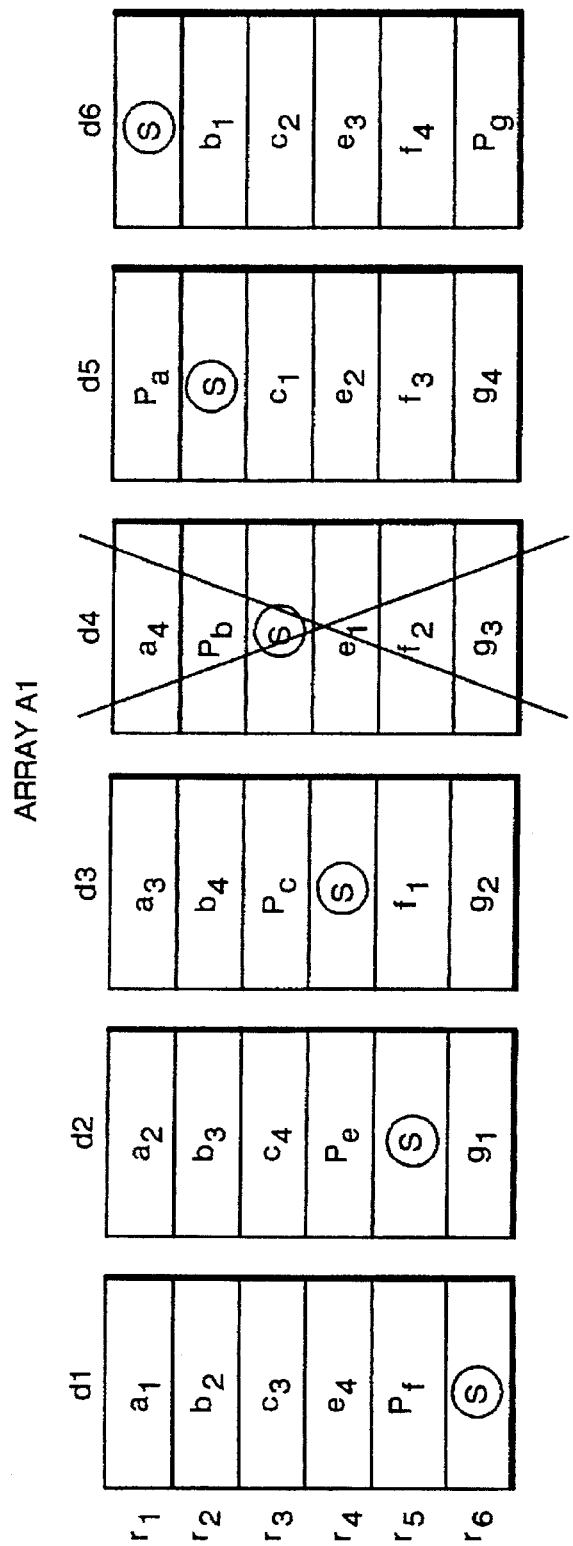
FIG. 7 represents the states of two device arrays in a storage subsystem with a device failure on Array A1.
Figure 7:
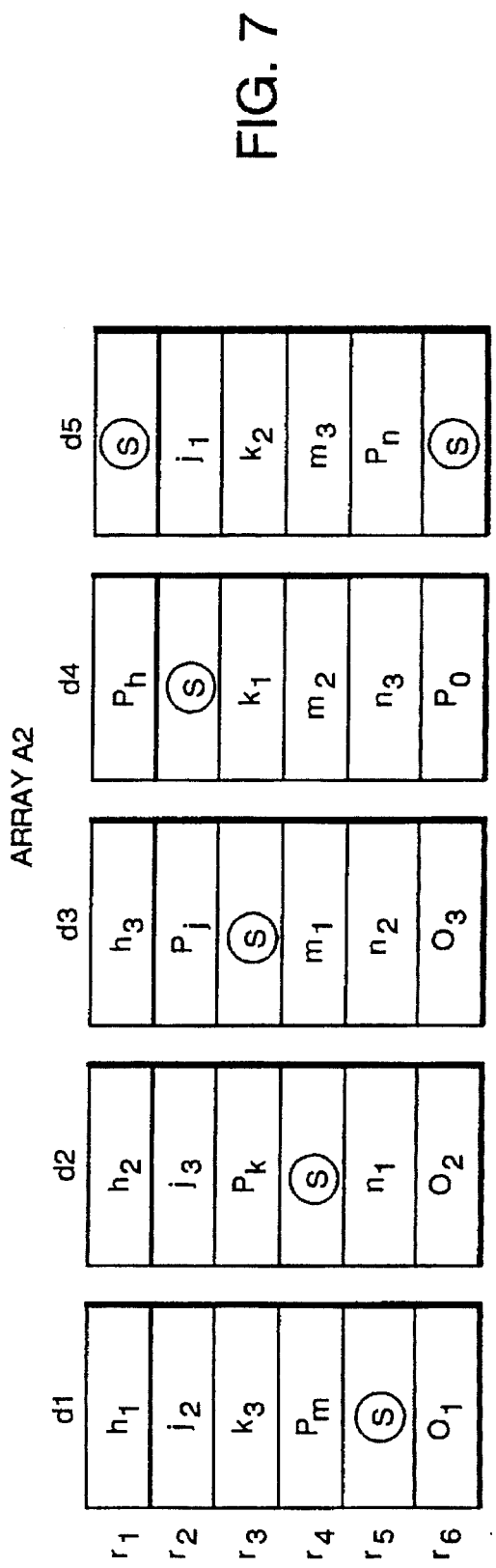
Figure 8:
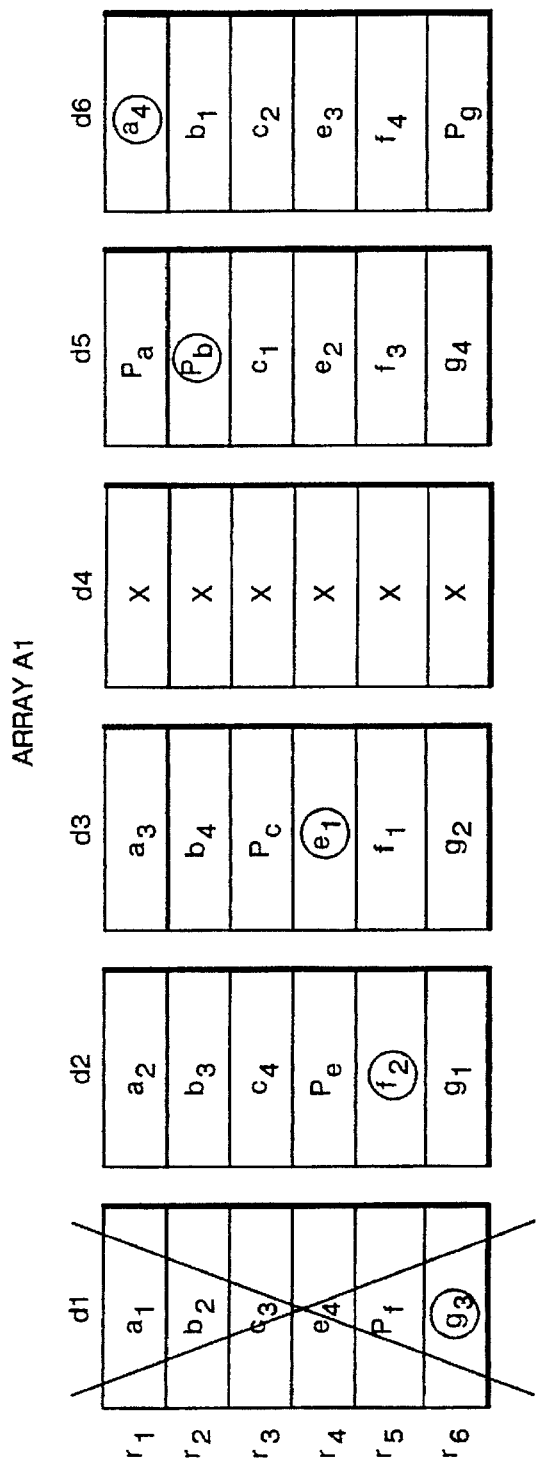
FIG. 8 shows the states of the arrays of FIG. 7 after data recovery from the first device failure and with a second device failure in Array A1.
Figure 8:
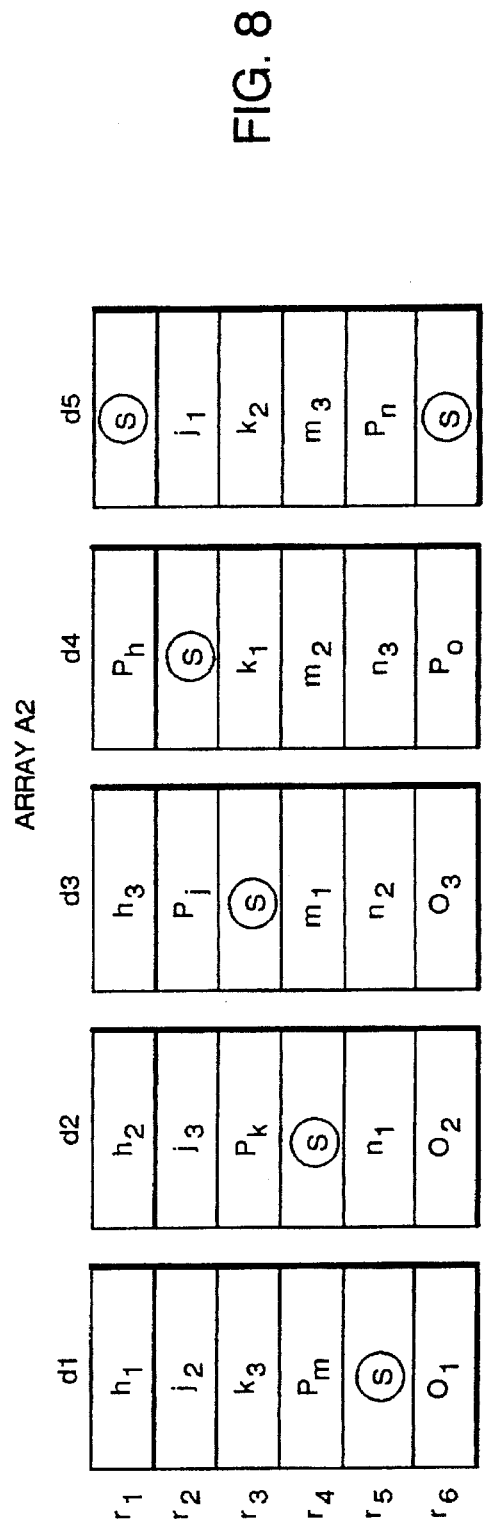

FIG. 7 shows a pair of subsystem arrays similar to those of FIG. 3 with the exception that array A2 now includes spares. Array A2 has an ($N_2+P_2+S_2$, $N_2=3$, $P_2=1$, $S_1=1$)

configuration comprising five devices, d1–d5, and having six distributed spares (one per row). Note that arrays A1 and A2 still have a same number of rows. According to the preferred sharing method of FIG. 5, if a device failure occurs on array A1 as indicated, a determination is made as to the availability of spares within that array. Since spares are indeed available, blocks a4, Pb, e1, f2 and g3 of failed device d4 are reconstructed and placed into these spares as shown in FIG. 8. The spares of array A1 are now depleted.

If a second device failure now occurs in array A1, e.g. on device D1, a determination is again made of spare availability within the array. This time, however, since there are no spares available. Next, the availability of dedicated spare space within the subsystem is determined. Assuming there is none, the availability of spares in other subsystem arrays is now assessed. Spares are identified on array A2, so the data and parity blocks of the failed device will be reconstructed and placed in these spares as shown in FIG. 9. For example, reconstructed block a1 is placed in row r1, device d5, of array A2. Block b2 is similarly reconstructed and placed in row r2, device d4 of array A2, and so on. Again, restoration of lost blocks in array A1 to corresponding rows of array A2 is for convenience only, and not a requirement of the present invention. After restoration, the spares of both arrays are depleted. Consequently, a third device failure on either array will require device replacement.

It will now be assumed that a plurality of arrays were present in the subsystem of FIG. 7, each having a same number of rows and some having unused distributed spares. Under these conditions, the second device failure is handled differently from the preceding example. Each array is checked, in sequence, to determine whether spare space is available therein. The checking sequence is predefined and may be arbitrary. If unused spare space is found in the array, lost data is reconstructed and placed in the spare space in the same manner as described for array A2 in FIG. 8. If unused spare space is not found, the next array in sequence is checked for unused spares until available spares are found or all of the arrays have been checked without success. Such a subsystem is able to recover from subsequent, nonconcurrent device failures until all spares within the arrays have been depleted.

The invention has now been described with reference to specific subsystems. However, the present invention may be applied to any subsystem having at least two arrays, at least a first array including distributed spares, and at least a second array having a same number of rows as the first. This and other extensions may be made without departing from the spirit and scope of the present invention as set forth in the following claims.

We claim:

1. In a storage subsystem comprising a plurality of arrays of storage devices including at least first and second arrays having a same number of rows, said first array configured to include a first plurality n of blocks of data, a parity block and a spare region per row, and said second array configured to include a second plurality m of blocks of data per row stored therein, where m may be unequal to n, a method for restoring lost ones of said blocks of data in an event of a device failure in one of said arrays, comprising the steps of:

first determining if spare regions are available in said one of said arrays in which said device failure occurred;

second determining if a dedicated spare storage device having spare regions is available in said storage subsystem, if said first determining step did not identify spare regions in said one of said arrays;

third determining if distributed spare regions are available in one or more other arrays in said storage subsystem, if said second determining step did not identify a dedicated spare storage device having spare regions;

reconstructing each of said lost blocks, and placing each of said reconstructed blocks in a spare region determined to be available by one of said determining steps.

2. The method of claim 1, wherein said blocks of information stored in said second array are arranged in a plurality of parity groups, each parity group including at least one data block and a parity block distributed in said second array such that no two blocks of said parity group reside on a same device.

3. The method of claim 1, wherein said reconstructing step further comprises the step of reconstructing each of said lost blocks from one or more remaining blocks of a same parity group.

4. The method of claim 2, wherein each parity block of a parity group is generated by exclusive OR-ing said data blocks of a same parity group.

5. The method of claim 3, wherein said reconstructing step further comprises the steps of:

retrieving said one or more remaining blocks of the same parity group; and exclusive OR-ing said one or more remaining blocks to form a reconstructed block.

6. The method of claim 2, wherein said parity blocks of said second array reside on a single device.

7. The method of claim 2, wherein said parity blocks of said second array are distributed among said devices of said second array.

8. The method of claim 1, wherein said second array is configured to include a spare region per row.

9. The method of claim 1, wherein said plurality of blocks of information stored in said first array are arranged in a plurality of parity groups, each parity group including at least one data block and a parity block distributed in said first array such that no two blocks of said parity group reside on the same device.

10. The method of claim 9, wherein said reconstructing step further comprises the step of reconstructing each of said lost blocks from one or more remaining blocks of a same parity group.

11. The method of claim 9, wherein each parity block of a parity group is generated by exclusive OR-ing said data blocks of a same parity group.

12. The method of claim 10, wherein said reconstruction of a lost block further comprises the steps of:

retrieving said one or more remaining of said blocks of the same parity group; and exclusive OR-ing said remaining blocks to form a reconstructed block.

13. The method of claim 9, wherein said parity blocks of said first array reside on a single device.

14. The method of claim 1, wherein said storage devices comprise magnetic disk drives.

15. The method of claim 1, wherein at least one of said arrays of storage devices is configured as a RAID 5 array.

16. In a storage subsystem comprising a plurality of arrays of storage devices including at least three arrays having a same number of rows, a first of said at least three arrays including a first plurality n of blocks of information stored therein, a second of said at least three arrays including a second plurality m of blocks of information stored therein, a third of said at least three arrays including a third plurality g of blocks of information stored therein, and at least said second and a third of said at least three arrays configured to include a spare region per row, where n, m, and q may have different values a method for recovering lost ones of said blocks of information in an event of a storage device failure in said first array, comprising the steps of:

first determining if a dedicated spare storage device having spare regions is available in said storage subsystem;

second determining if distributed spare regions are available in one or more other arrays in said storage subsystem, if said first determining step did not identify a dedicated spare storage device having spare regions;

if spare regions are available as determined by said determining steps, reconstructing each of said lost blocks, and placing each of said reconstructed blocks in one of said available spare regions.

17. The method of claim 16, wherein said blocks of information stored in said first array are arranged in a plurality of parity groups, each parity group including at least one data block and a parity block distributed in said first array such that no two blocks of said parity group reside on the same device.

18. The method of claim 16 wherein said reconstructing steps further comprise reconstructing each of said lost blocks from one or more remaining blocks of a same parity group.

19. The method of claim 17, wherein each parity block of a parity group is generated by exclusive OR-ing said data blocks of the same parity group.

20. The method of claim 18, wherein said reconstruction of a lost block further comprises the steps of:

retrieving said one or more remaining blocks of said same parity group; and exclusive OR-ing said one or more remaining blocks to form a reconstructed block.

21. The method of claim 17, wherein said parity blocks of said first array reside on a single device.

22. The method of claim 16, wherein said parity blocks of said first array are distributed among said devices of said third array.

23. The method of claim 16, wherein said first array is configured to include a spare region per row.

24. The method of claim 23, wherein said second array includes a plurality of blocks of information stored therein.

25. The method of claim 24, further comprising the steps of:

in the event of a storage device failure in said second array resulting in the loss of at least one of said blocks of information, determining if said spare regions of one of said first and third arrays are available;

if said spare regions are available, reconstructing each of said lost blocks, and placing each of said reconstructed blocks in one of said available spare regions;

if said spare regions are not available, determining if said spare regions of the other of said first and third arrays are available; and if said spare regions are available, reconstructing each of said lost blocks, and placing each of said reconstructed blocks in one of said available spare regions.

26. The method of claim 24, wherein said blocks of information stored in said second array are arranged in a plurality of parity groups, each parity group including at least one data block and a parity block distributed in said second array such that no two blocks of said parity group reside on the same device.

27. The method of claim 25, wherein said reconstructing step further comprises the step of reconstructing each of said lost blocks from one or more remaining blocks of a same parity group.

28. The method of claim 26, wherein each parity block of a parity group is generated by exclusive OR-ing said data blocks of a same parity group.

29. The method of claim 27, wherein said reconstruction of a lost block further comprises the steps of:

retrieving the remaining blocks of the same parity group; and exclusive OR-ing said remaining blocks to form a reconstructed block.

30. The method of claim 26, wherein said parity blocks of said second array reside on a single device.

31. The method of claim 26, wherein said parity blocks of said second array are distributed among said devices of said second array.

32. The method of claim 16, wherein each array of said subsystem has a same number of rows.

33. The method of claim 16, wherein n>2 arrays of said subsystem, including said second and third arrays, are configured to include a spare region per row and have a same number of rows as said first array.

34. The method of claim 33 wherein if said spare regions of said second and third arrays are not available, repeating the following steps until either a) said spare regions of one of said n arrays are determined to be available or b) a determination of unavailability has been made for each of said spare regions of said n arrays:

determining if said spare regions of a next of said n arrays are available; and if said spare regions are available, reconstructing each of said lost blocks, and placing each of said reconstructed blocks in one of said available spare regions.

35. The method of claim 16, wherein said storage devices comprise magnetic disk drives.

36. The method of claim 16, wherein at least one of said arrays of storage devices is configured as a RAID 5 array.

37. A storage subsystem comprising:

a plurality of arrays of storage devices including at least first and second arrays having a same number of rows, said first array configured to include a first plurality n of blocks of data, a parity block and a spare region per row, and said second array including a second plurality m of blocks of data per row stored therein, where m may be unequal to n;

first means responsive to a device failure in one of said arrays, resulting in a loss of at least one of said blocks of information, for determining if one or more of said spare regions of said first array are available for storing one or more blocks of information;

second means for determining if a dedicated spare storage device having spare regions is available in said storage subsystem, if said first means for determining did not identify spare regions in said first array;

third means for determining if distributed spare regions are available in one or more other arrays in said storage subsystem, if said second means for determining did not identify a dedicated spare storage device having spare regions;

means responsive to said first, second and third determining means for reconstructing said lost blocks if spare regions are available; and means for placing each of said reconstructed blocks in one of said available spare regions.

38. The storage subsystem of claim 37, wherein said blocks of information stored in said second array are arranged in a plurality of parity groups, each parity group including at least one data block and a parity block distributed in said second array such that no two blocks of said parity group reside on the same device.

39. The storage subsystem of claim 37, wherein said reconstructing means further comprise means for reconstructing each of said lost blocks from one or more remaining blocks of a same parity group.

40. The storage subsystem of claim 38, wherein each parity block of a parity group is generated by exclusive OR-ing said data blocks of a same parity group.

41. The storage subsystem of claim 39, wherein said reconstructing means further comprises:

means for retrieving said one or more remaining blocks of said same parity group; and means for exclusive OR-ing said one or more remaining blocks to form a reconstructed block.

42. The storage subsystem of claim 38, wherein said parity blocks of said second array reside on a single device.

43. The storage subsystem of claim 38, wherein said parity blocks of said second array are distributed among said devices of said second array.

44. The storage subsystem of claim 37, wherein said second array is configured to include a spare region per row.

45. The storage subsystem of claim 37, wherein said plurality of blocks of information stored in said first array are arranged in a plurality of parity groups, each parity group including at least one data block and a parity block distributed in said first array such that no two blocks of said parity group reside on the same device.

46. The storage subsystem of claim 45, wherein said reconstructing means further comprises means for reconstructing each of said lost blocks from one or more remaining blocks of a same parity group.

47. The storage subsystem of claim 45, wherein each parity block of a parity group is generated by exclusive OR-ing said data blocks of a same parity group.

48. The storage subsystem of claim 38, wherein said reconstructing means further comprises:

means for retrieving said one or more remaining of said blocks of the same parity group; and means for exclusive OR-ing said remaining blocks to form a reconstructed block.

49. The storage subsystem of claim 45, wherein said parity blocks of said first array reside on a single device.

50. The storage subsystem of claim 37, wherein said storage devices comprise magnetic disk drives.

51. The storage subsystem of claim 37, wherein at least one of said arrays of storage devices is configured as a RAID 5 array.

52. A storage subsystem, comprising:

a plurality of arrays of storage devices including at least three arrays having a same number of rows, a first of said at least three arrays including a first plurality n of blocks of information stored therein, a second of said at least three arrays including a second plurality m of blocks of information stored therein, a third of said at least three arrays including a third plurality g of blocks of information stored therein, and at least said second and said third of said at least three arrays configured to include a spare region per row where n, m, and g may have different values;

first means responsive to a storage device failure in one of said arrays resulting in a loss of at least one of said blocks of information, for determining if a dedicated spare storage device having spare regions is available in said at least second and third arrays;

second means for determining if distributed spare regions are available in one or more other arrays in said storage subsystem, if said first determining step did not identify a dedicated spare storage device having spare regions;

means responsive to said first and second determining means for reconstructing each of said lost blocks if said one or more spare regions are available; and means for placing each of said reconstructed blocks in one of said available spare regions.

53. The storage subsystem of claim 52, wherein said blocks of information stored in said first array are arranged in a plurality of parity groups, each parity group including at least one data block and a parity block distributed in said first array such that no two blocks of said parity group reside on the same device.

54. The storage subsystem of claim 52, wherein said reconstructing means further comprises means for reconstructing each of said lost blocks from said one or more remaining blocks of a same parity group.

55. The storage subsystem of claim 53, wherein each parity block of a parity group is generated by exclusive OR-ing said data blocks of the same parity group.

56. The storage subsystem of claim 53, wherein said reconstructing means further comprises:

means for retrieving said one or more remaining of said blocks of said same parity group; and means for exclusive OR-ing said remaining blocks to form a reconstructed block.

57. The storage subsystem of claim 53, wherein said parity blocks of said first array reside on a single device.

58. The storage subsystem of claim 52, wherein said parity blocks of said first array are distributed among said devices of said third array.

59. The storage subsystem of claim 52, wherein said first array is configured to include a spare region per row.

60. The storage subsystem of claim 59, wherein said second array includes a plurality of blocks of information stored therein.

61. The storage subsystem of claim 60, further comprising:

means responsive to a storage device failure in said second array resulting in a loss of at least one of said blocks of information, for determining if said spare regions of one of said first and third arrays are available;

means responsive to said determining means for reconstructing each of said lost blocks if said spare regions are available; and means for placing each of said reconstructed blocks in one of said available spare regions.

62. The storage subsystem of claim 61, wherein said blocks of information stored in said second array are arranged in a plurality of parity groups, each parity group including at least one data block and a parity block distributed in said second array such that no two blocks of said parity group reside on the same device.

63. The storage subsystem of claim 61, wherein said reconstructing step further comprises reconstructing each of said lost blocks from one or more remaining blocks of a same parity group.

64. The storage subsystem of claim 62, wherein each parity block of a parity group is generated by exclusive OR-ing said data blocks of a same parity group.

65. The storage subsystem of claim 63, wherein said reconstructing means further comprises:
means for retrieving the remaining blocks of the same parity group; and
means for exclusive OR-ing said remaining blocks to form said reconstructed block.

66. The storage subsystem of claim 62, wherein said parity blocks of said second array reside on a single device.

67. The storage subsystem of claim 62, wherein said parity blocks of said second array are distributed among said devices of said second array.

68. The storage subsystem of claim 52, wherein each array of said subsystem has a same number of rows.

69. The storage subsystem of claim 52, wherein n>2 arrays of said subsystem, including said second and third arrays, are configured to include a spare region per row and have a same number of rows as said first array.

70. The storage subsystem of claim 69, wherein said determining means further comprises means for determining if said spare regions are available on a next of said n arrays if said spare regions of said second and third arrays are not available.

71. The storage subsystem of claim 70, further comprising:
means responsive to said determining means for reconstructing each of said lost blocks; and
means for placing each of said reconstructed blocks in one of said spare regions.

72. The storage subsystem of claim 52, wherein said storage devices comprise magnetic disk drives.

73. The storage subsystem of claim 52, wherein at least one of said arrays of storage devices is configured as a RAID 5 array.

74. A computer system, comprising:
a central processing unit (CPU); and
a storage subsystem, said storage subsystem further comprising,
a plurality of arrays of storage devices including first and second arrays having a same number of rows, said first array configured to include a first plurality n of blocks of data, a parity block and a spare region per row, and said second array configured to include a second plurality m of blocks of data per row stored therein, where m may be unequal to n,; first means responsive to a device failure in one of said arrays resulting in a loss of at least one of said blocks of data, for first determining if spare regions are available in said one of said arrays in which said device failure occurred;
second means for determining if a dedicated spare storage device having spare regions is available in said storage subsystem, if said first determining means did not identify spare regions in said one of said arrays;
third means for determining if distributed spare regions are available in one or more other arrays in said storage subsystem, if said second determining means did not identify a dedicated spare storage device having spare regions;
means responsive to said first, second and third determining
means for reconstructing said lost blocks if said spare regions are available;
means for placing each of said reconstructed blocks in one of said available spare regions;
means for controlling said storage subsystem; and
means for linking said CPU to said subsystem.

75. The computer system of claim 74, wherein said blocks of information stored in said second array are arranged in a plurality of parity groups, each parity group including at least one data block and a parity block distributed in said second array such that no two blocks of said parity group reside on the same device.

76. The computer system of claim 74, wherein said reconstructing means further comprise means for reconstructing each of said lost blocks from one or more remaining blocks of a same parity group.

77. The computer system of claim 75, wherein each parity block of a parity group is generated by exclusive OR-ing said data blocks of a same parity group.

78. The computer system of claim 76, wherein said reconstructing means further comprises:
means for retrieving said one or more remaining said blocks of said same parity group; and
means for exclusive OR-ing said one or more remaining blocks to form a reconstructed block.

79. The computer system of claim 75, wherein said parity blocks of said second array reside on a single device.

80. The computer system of claim 75, wherein said parity blocks of said second array are distributed among said devices of said second array.

81. The computer system of claim 74, wherein said second array is configured to include a spare region per row.

82. The computer system of claim 74, wherein said plurality of blocks of information stored in said first array are arranged in a plurality of parity groups, each parity group including at least one data block and a parity block distributed in said first array such that no two blocks of said parity group reside on the same device.

83. The computer system of claim 82, wherein said reconstructing means further comprises means for reconstructing each of said lost blocks from one or more remaining blocks of a same parity group.

84. The computer system of claim 82, wherein each parity block of a parity group is generated by exclusive OR-ing said data blocks of a same parity group.

85. The computer system of claim 75, wherein said reconstructing means further comprises:
means for retrieving said one or more remaining of said blocks of the same parity group; and
means for exclusive OR-ing said remaining blocks to form a reconstructed block.

86. The computer system of claim 82, wherein said parity blocks of said first array reside on a single device.

87. The computer system of claim 74, wherein said storage devices comprise magnetic disk drives.

88. The computer system of claim 74, wherein at least one of said arrays of storage devices is configured as a RAID 5 array.

89. The computer system of claim 74, wherein said computer comprises an IBM AS/400 data processing system.

90. The computer system of claim 74, wherein said controlling means comprises a storage control unit that includes a microprocessor.

91. The computer system of claim 90, wherein said storage control unit and said storage subsystem comprise an IBM 9337 storage subsystem.

92. The computer system of claim 74, wherein said linking means comprises a SCSI interface.

93. The computer system of claim 74, wherein said controlling means comprises a storage controller residing in said CPU.

94. The computer system of claim 93, wherein said storage controller comprises a Mylex DAC960P RAID adapter.

* * * * *

UNITED STATES PATENT AND TRADEMARK OFFICE
CERTIFICATE OF CORRECTION

PATENT NO. : 5,657,439

DATED : August 12, 1997

INVENTOR(S) : JONES et al

It is certified that error appears in the above-indentified patent and that said Letters Patent is hereby corrected as shown below:

| | |
|---|---|
| Column 13, line 1 | Delete "g" and Insert --q-- |
| Column 15, line 63 | Delete "g" and Insert --q-- |
| Column 15, line 66 | Delete "g" and Insert --q-- |

Signed and Sealed this

Second Day of December, 1997

Attest:

BRUCE LEHMAN

*Attesting Officer*   *Commissioner of Patents and Trademarks*